United States Patent
Ueno et al.

(10) Patent No.: US 12,074,279 B2
(45) Date of Patent: Aug. 27, 2024

(54) SOLID ELECTROLYTE MATERIAL AND BATTERY USING SAME

(71) Applicant: Panasonic Intellectual Property Management Co., Ltd., Osaka (JP)

(72) Inventors: Koki Ueno, Osaka (JP); Masashi Sakaida, Hyogo (JP); Akihiro Sakai, Nara (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 450 days.

(21) Appl. No.: 17/471,151

(22) Filed: Sep. 9, 2021

(65) Prior Publication Data

US 2021/0408585 A1 Dec. 30, 2021

Related U.S. Application Data

(63) Continuation of application No. PCT/JP2019/048208, filed on Dec. 10, 2019.

(30) Foreign Application Priority Data

Mar. 26, 2019 (JP) .................................. 2019-058342

(51) Int. Cl.
*H01M 10/0562* (2010.01)
*H01M 4/04* (2006.01)
*H01M 10/0525* (2010.01)

(52) U.S. Cl.
CPC ..... *H01M 10/0562* (2013.01); *H01M 4/0407* (2013.01); *H01M 10/0525* (2013.01); *H01M 2300/0068* (2013.01)

(58) Field of Classification Search
CPC .......... H01M 10/0562; H01M 4/0407; H01M 10/0525

(Continued)

(56) References Cited

U.S. PATENT DOCUMENTS

2012/0301796 A1   11/2012   Ohtomo et al.
2016/0365602 A1*  12/2016   Sousa Soares De Oliveira Braga .................... H01G 11/56

(Continued)

FOREIGN PATENT DOCUMENTS

EP   3 745 522 A1   12/2020
JP   S50-71598 A    6/1975

(Continued)

OTHER PUBLICATIONS

Kanno et al., Ionic Conductivity and Phase Transition of the Bromide Spinels, Li2-2xM1+xBr4 (M=Mg, Mn), 1986, Journal of the Electrochemical Society, 133, Abstract and p. 1052 (Year: 1986).*

(Continued)

*Primary Examiner* — James M Erwin
*Assistant Examiner* — John S Medley
(74) *Attorney, Agent, or Firm* — Greenblum & Bernstein, P.L.C.

(57) ABSTRACT

The present disclosure provides a solid electrolyte material having high lithium ion conductivity. The solid electrolyte material of the present disclosure includes Li, M and X. M is at least one element selected from the group consisting of Mg, Zn and Cd. X is at least two elements selected from the group consisting of Cl, Br and I.

4 Claims, 10 Drawing Sheets

(58) Field of Classification Search
USPC .......................................................... 429/322
See application file for complete search history.

(56) References Cited

U.S. PATENT DOCUMENTS

2019/0140265 A1* 5/2019 Miara ............... H01M 10/0525
2020/0006808 A1* 1/2020 Utsuno ................. H01B 13/00

FOREIGN PATENT DOCUMENTS

JP            S5071598 A * 6/1975 ................ C01F 5/26
JP            2011-129312     6/2011

OTHER PUBLICATIONS

Yu et al., Formulation of Li-Metal-Halide (LMX) Solid State Electrolytes through Extensive First Principles Modelling, Oct. 29, 2021, Journal of Materials Chemistry A, 9, pp. 25585-25594 (Year: 2021).*

International Search Report of PCT application No. PCT/JP2019/048208 dated Mar. 3, 2020.

Ryoji Kanno et al., "Ionic Conductivity and Phase Transition of the Spinel System $Li_{2-2x}M1_{+x}Cl_4$ (M=Mg, Mn, Cd)", Journal of the Electrochemical Society, vol. 131, No. 3, Jan. 1984, pp. 469-474.

EESR for EP App. No. 19 92 2020.3, dated Mar. 28, 2022.

* cited by examiner

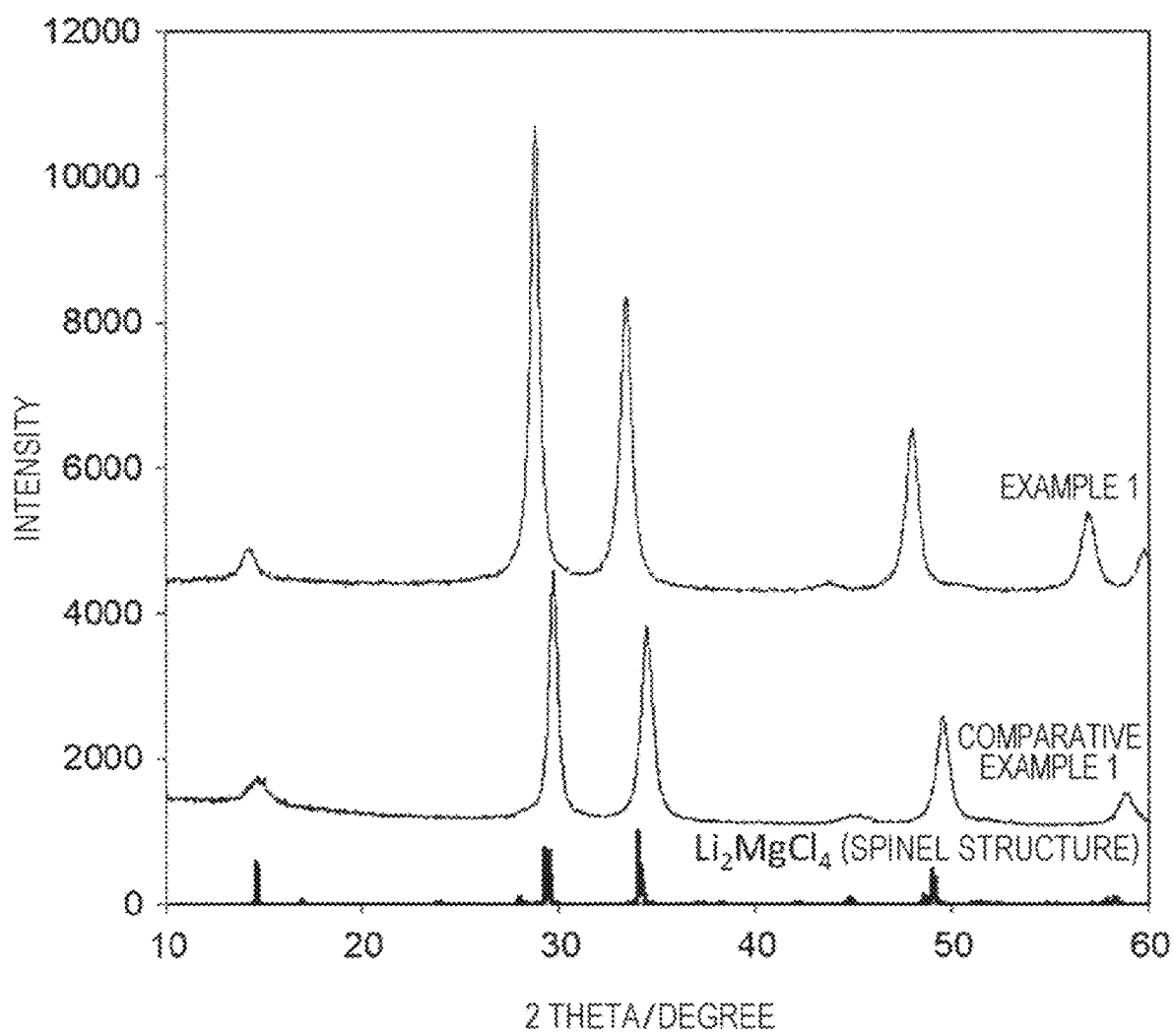

SOLID ELECTROLYTE MATERIAL AND BATTERY USING SAME

BACKGROUND

1. Technical Field

The present disclosure relates to a solid electrolyte material and a battery using the same.

2. Description of the Related Art

Japanese Unexamined Patent Application Publication No. 2011-129312 (Patent Literature 1) discloses an all-solid-state battery using a sulfide solid electrolyte material.

Kanno R, Takeda Y, Takeda K and Yamamoto O, 1984 J. Electrochem. Soc., 131, 469-74 (Non Patent Literature 1) disclose a halide solid electrolyte having a spinel structure.

SUMMARY

One non-limiting and exemplary embodiment provides a solid electrolyte material having high lithium ion conductivity.

In one general aspect, the techniques disclosed here feature a solid electrolyte material including Li, M and X wherein M is at least one element selected from the group consisting of Mg, Zn and Cd, and X is at least two elements selected from the group consisting of Cl, Br and I.

The solid electrolyte material provided according to the present disclosure has high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a graph illustrating X-ray diffraction patterns of solid electrolyte materials of EXAMPLE 1 and COMPARATIVE EXAMPLE 1 and an X-ray diffraction pattern of $Li_2MgCl_4$ having a spinel structure.

DETAILED DESCRIPTION

Figure 1:
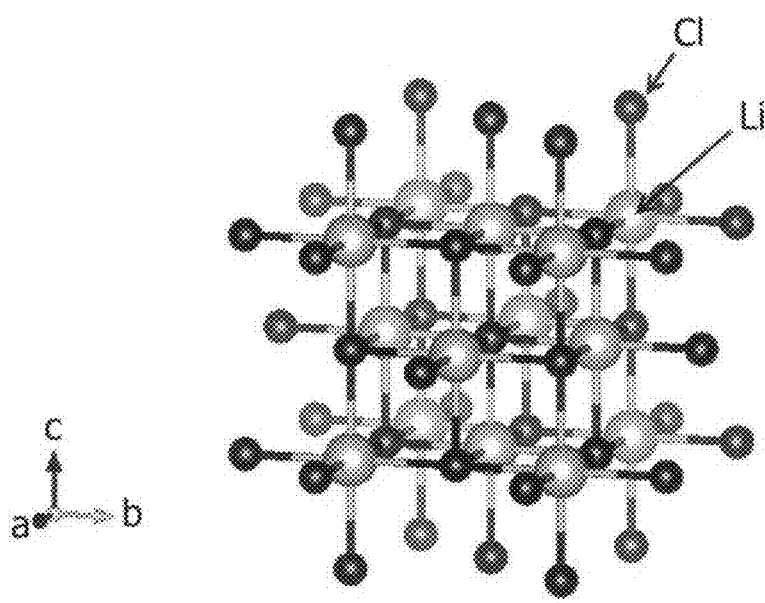
FIG. 1 illustrates a crystal structure of LiCl having a rock salt structure.

Embodiments of the present disclosure will be described hereinbelow with reference to the drawings.

First Embodiment

A solid electrolyte material according to a first embodiment includes Li, M and X. M is at least one element selected from the group consisting of Mg, Zn and Cd. X is at least two elements selected from the group consisting of Cl, Br and I.

The solid electrolyte material according to the first embodiment has high lithium ion conductivity. Thus, the solid electrolyte material according to the first embodiment may be used to obtain a battery having excellent charge/discharge characteristics. An example of such batteries is an all-solid-state secondary battery.

The solid electrolyte material according to the first embodiment does not contain sulfur and therefore does not generate hydrogen sulfide even when exposed to the atmosphere. Thus, the solid electrolyte material according to the first embodiment is highly safe.

The solid electrolyte material according to the first embodiment may contain an element that is inevitably mixed. Examples of such elements include hydrogen, nitrogen and oxygen. Such elements may be present in powders of raw materials of the solid electrolyte material or in the atmosphere in which the solid electrolyte material is produced or stored.

M is at least one element selected from the group consisting of Mg, Zn and Cd. As a result of this, the solid electrolyte material according to the first embodiment may have a spinel structure. Thus, the solid electrolyte material according to the first embodiment attains high ion conductivity and high stability as described in Non Patent Literature 1.

In solid electrolyte materials having lithium ion conductivity, it is desirable that the number of anions coordinated to a lithium ion (for example, X in the solid electrolyte material according to the first embodiment) be small. The reason for this is as follows.

In order for a lithium ion to be conducted, the bonds between the lithium ion and the anions that are adjacent to the lithium ion have to be broken. The smaller the energy for breaking the bonds, the more easily the lithium ions are conducted. Lithium ions coordinated with a smaller number of anions have less bonds that are to be broken, and thus the bonds are broken with a smaller amount of energy. As a result, the lithium ions are conducted easily. In crystals containing lithium ions, the number of anions coordinated to the lithium ion is generally 4 or 6. In spinel structures, the number of anions coordinated to a lithium ion is dominantly 4 and thus high lithium ion conductivity can be realized.

M may be a single element selected from the group consisting of Mg, Zn and Cd, or may be two or more of these elements. Mg, Zn and Cd can all form a spinel structure and thus may be used in combination. Further, Mg, Zn and Cd are inexpensive elements. Thus, the use of Mg, Zn and Cd may reduce the cost of the solid electrolyte material.

To enhance the ion conductivity of the solid electrolyte material, the solid electrolyte material according to the first embodiment may be a material represented by the following compositional formula (1).

$$Li_{4-2a}M_aX_4 \quad (1)$$

Here, 0<a<2.0.

To enhance the ion conductivity of the solid electrolyte material, M may include Mg.

The electronegativity of X is influential to the lithium ion conductivity. The bonds between Li and X are stronger and are more difficult to break with increasing difference in electronegativity between Li and X. Thus, in order to enhance the lithium ion conductivity, X may include at least one element selected from the group consisting of Br and I each having a relatively small electronegativity.

To enhance the ion conductivity of the solid electrolyte material, the solid electrolyte material according to the first embodiment may be a material represented by the following compositional formula (2).

$$Li_{4-2a}Mg_aCl_pX'_{4-p} \quad (2)$$

Here, X is at least one element selected from the group consisting of Br and I, 0<a<2.0, and 0≤p≤2.

To enhance the ion conductivity of the solid electrolyte material, the letter a may be 1.

To enhance the ion conductivity of the solid electrolyte material, the solid electrolyte material according to the first embodiment may have a spinel structure.

<Structural Dependence of Anion Substitution Effects>

Effects will be described below that are obtained by substituting anions in rock salt structures and spinel structures by other anions. For example, LiCl has a rock salt structure and $Li_2MgCl_4$ has a spinel structure. Here, the anion is Cl. The anion for substituting for Cl is, for example, Br or I.

The rock salt structure is, for example, a crystal structure that may be possessed by a compound composed of a cation A and an anion B. Such a compound is represented by the chemical formula AB. A is placed in the octahedral voids in the face-centered cubic lattices formed by B. That is, A forms face-centered cubic lattices different from those of B.

The spinel structure is, for example, a crystal structure that may be possessed by a compound composed of cations A and B, and an anion X. When such a compound has a spinel structure, the compound is represented by the chemical formula $A_2BX_4$. Half of A, and B are placed in the octahedral voids in the face-centered cubic lattices formed by X, and the remaining A is placed in the tetrahedral voids.

Figure 2:
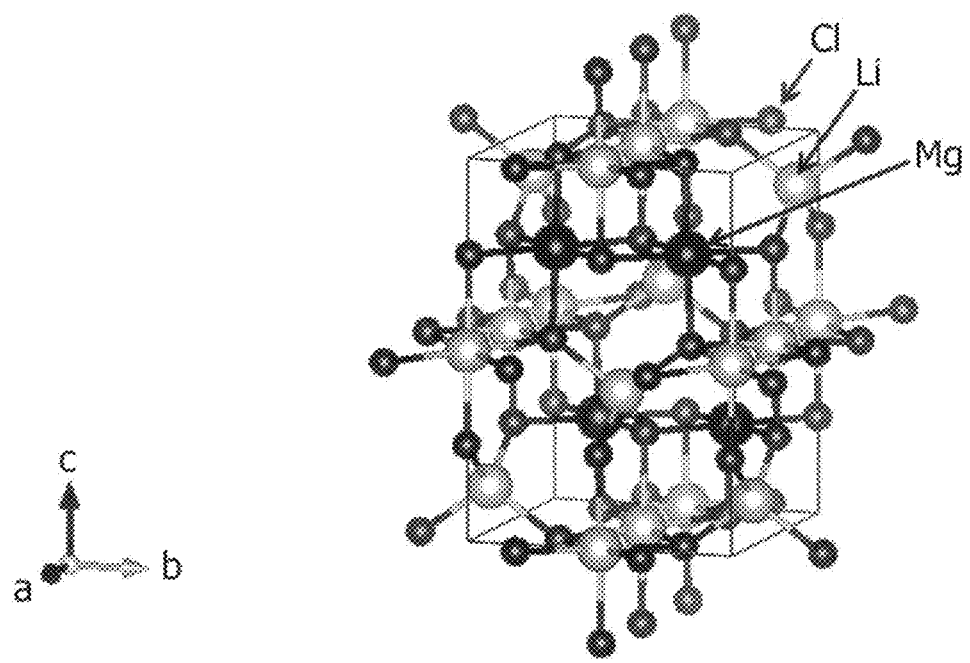
FIG. 2 illustrates a crystal structure of $Li_2MgCl_4$ having a spinel structure.

FIG. 1 illustrates a crystal structure of LiCl having a rock salt structure. FIG. 2 illustrates a crystal structure of $Li_2MgCl_4$ having a spinel structure. The crystal structures illustrated in FIGS. 1 and 2 were optimized by first-principles calculation. The first-principles calculation was performed using the PAW (projector augmented wave) method based on the density functional theory. In the optimization of the crystal structures, GGA-PBE was used to describe the electron density in the exchange-correlation term expressing the interaction between electrons. GGA represents generalized gradient approximation. PBE represents Perdew-Burke-Emzerhof. Using the optimized crystal structures, Properties 1 to 6 below were calculated.

Property 1: Average Li-anion bond distance
Property 2: Maximum Li-anion bond distance
Property 3: Minimum Li-anion bond distance
Property 4: Standard deviation of Li-anion bond distances
Property 5: Fill factor of structure excluding Li
Property 6: Narrowest space $r_{min}$ in paths each including a straight line connecting Li and Li to each other The methods for calculating Properties 1 to 6 will be described below.

(Property 1)

The bond distance between Li and the anion was calculated with respect to all the Li sites in the crystal structure. From the calculation results obtained, the average Li-anion bond distance was determined.

(Property 2)

The bond distance between Li and the anion was calculated with respect to all the Li sites in the crystal structure. From the calculation results obtained, the maximum Li-anion bond distance was determined.

(Property 3)

The bond distance between Li and the anion was calculated with respect to all the Li sites in the crystal structure. From the calculation results obtained, the minimum Li-anion bond distance was determined.

(Property 4)

The bond distance between Li and the anion was calculated with respect to all the Li sites in the crystal structure. From the calculation results obtained, the standard deviation of the Li-anion bond distances was determined.

(Property 5)

The fill factor of the structure excluding Li is the ratio of the atoms other than Li to the volume of the crystal structure. Here, the fill factor was calculated by the Monte Carlo method using the ionic bond radii shown in Table 1. In the Monte Carlo method, the calculation was made by randomly sampling 100,000 points in the crystal structure and counting the number of points within the ionic radius in the sites of the respective atoms. This calculation was performed three times, and the calculation results were averaged to give the fill factor. The "ionic bond radii" are values based on the definition described in "Shannon et al., Acta A32 (1976) 751".

(Property 6)

Figure 6A:
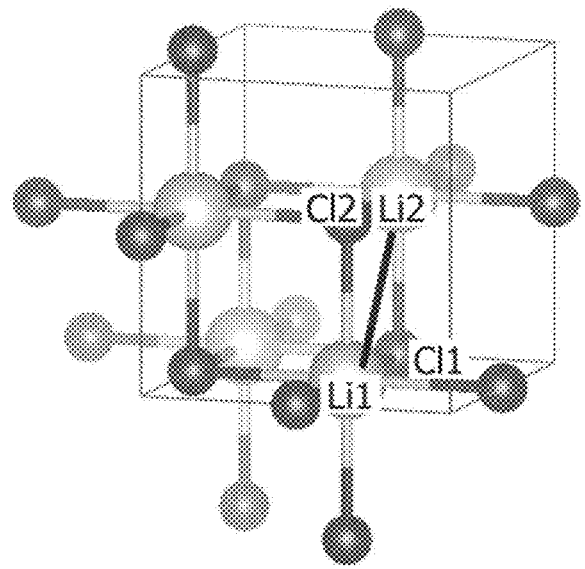
FIG. 6A is a view for explaining the narrowest space $r_{min}$ in paths each including a straight line connecting Li and Li to each other.
Figure 6B:
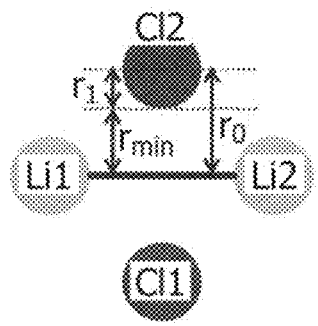
FIG. 6B is a view for explaining the narrowest space $r_{min}$ in paths each including a straight line connecting Li and Li to each other.

FIGS. 6A and 6B are views for explaining the narrowest space $r_{min}$ in paths each including a straight line connecting Li and Li to each other. As illustrated in FIG. 6A, the first Li (namely Li1) and the second Li (namely Li2) closest to the first Li are connected to each other by a straight line. As illustrated in FIG. 6B, atoms other than Li1 and Li2 are projected vertically onto the straight line, and the atoms projected on the straight line (for example, Cl1 and Cl2) are extracted. These atoms can be an obstacle when the first Li moves to the position of the second Li. Here, let $r_0$ be the distance from the extracted atom to the straight line, and let r be the value obtained by subtracting the ionic bond radius $r_1$ of the atom from $r_0$. The value of r was calculated with respect to a plurality of extracted atoms, and the smallest value r was determined as $r_{min}$. That is, $r_{min}$ is the narrowest part of the diffusion paths in which Li ions are conducted. Thus, the ion conductivity is enhanced with increasing value of $r_{min}$.

The atomic radii used in Property 5 and Property 6 were "ionic bond radii" or "covalent bond radii" depending on the coordination environment of the atoms of interest. Specifically, an atom present within 4 Å from the atom of interest was extracted, and the difference in electronegativity between that atom and the atom of interest was calculated. The differences in electronegativity between the atom of interest and each of the atoms present within 4 Å from the atom of interest were averaged. The ionic bond radius was adopted when the average value obtained was greater than or equal to 2, and the covalent bond radius was used when the average value was less than 2. The "covalent bond radii" are values described in "Cordero, B et al., Dalton Trans., 2832 (2008)". The "electronegativities" are values described in "A. L. Allred, J. Inorg. Nucl. Chem., 17, 215 (1961)".

TABLE 1

| Elements | Electronegativities | Ionic bond radii [Å] | Covalent bond radii [Å] |
|---|---|---|---|
| Li | 0.98 | 0.90 | 1.28 |
| Mg | 1.31 | 0.86 | 1.41 |
| Cl | 3.16 | 1.67 | 1.02 |
| Br | 2.96 | 1.82 | 1.20 |

Figure 3:
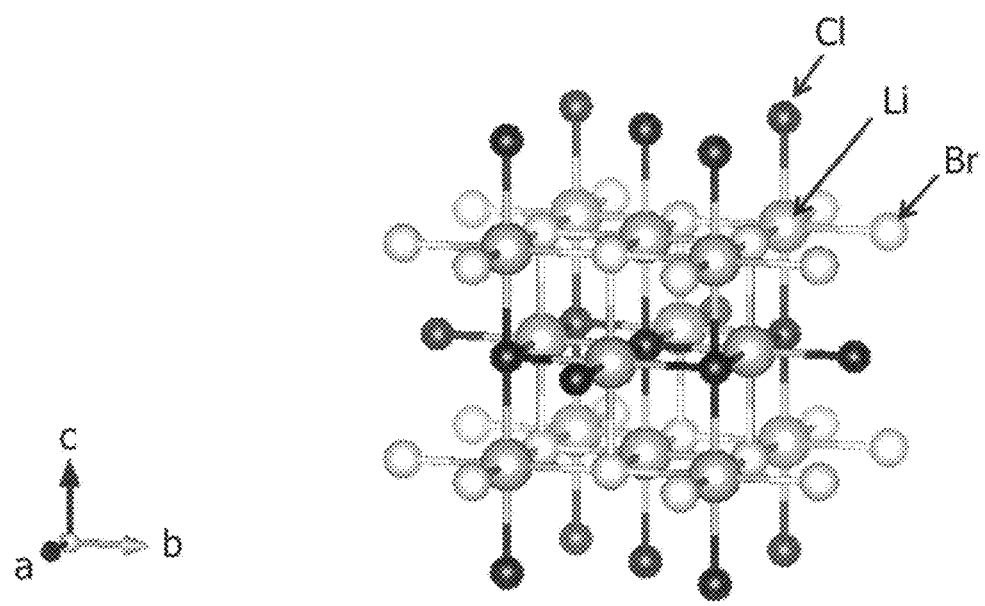
FIG. 3 illustrates a crystal structure of LiCl having a rock salt structure in which 50% of Cl is substituted by Br.
Figure 4:
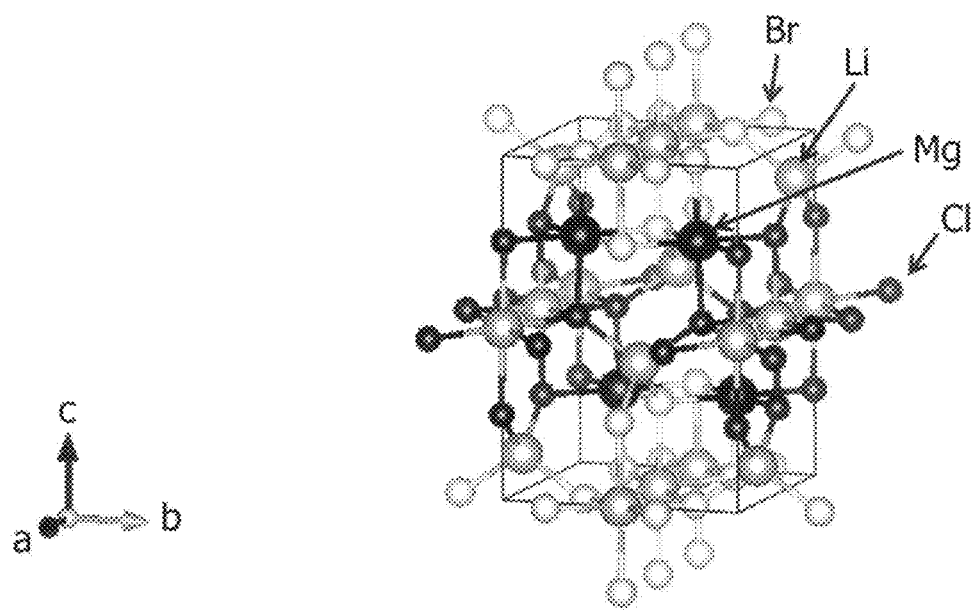
FIG. 4 illustrates a crystal structure of $Li_2MgCl_4$ having a spinel structure in which 50% of Cl is substituted by Br.
Figure 5:
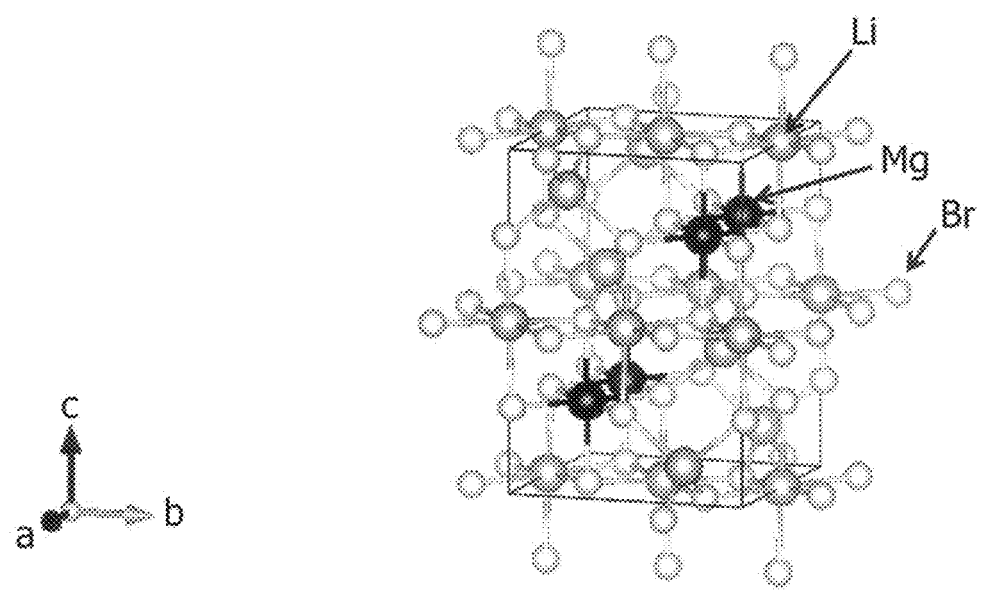
FIG. 5 illustrates a crystal structure of $Li_2MgCl_4$ having a spinel structure in which 100% of Cl is substituted by Br.

Structures are discussed in which LiCl having a rock salt structure and $Li_2MgCl_4$ having a spinel structure are substituted with Br in place of at least part of Cl. FIG. 3 illustrates a crystal structure of LiCl having a rock salt structure in which 50% of Cl is substituted by Br. FIG. 4 illustrates a crystal structure of $Li_2MgCl_4$ having a spinel structure in which 50% of Cl is substituted by Br. FIG. 5 illustrates a crystal structure of $Li_2MgCl_4$ having a spinel structure in which 100% of Cl is substituted by Br. In the present disclosure, "50%" and "100%" indicating the amounts of substitution mean "50 mol %" and "100 mol %", respectively.

With respect to the crystal structures illustrated in FIGS. 3, 4 and 5, the crystal structures were optimized by the first-principles calculation, and the values of Properties 1 to 6 were determined in the similar manner to the crystal structures illustrated in FIGS. 1 and 2. Table 2 describes the results of Properties 1 to 6. Table 3 describes the rates of change in the values of Properties 1 to 6 before and after the elemental substitution of Cl by Br.

TABLE 2

| | Property 1 [Å] | Property 2 [Å] | Property 3 [Å] | Property 4 [Å] | Property 5 | Property 6 [Å] |
|---|---|---|---|---|---|---|
| Rock salt structure (Before substitution; FIG. 1) | 3.043 | 4.455 | 2.572 | 0.815 | 0.130 | 0.149 |
| Rock salt structure (After 50% substitution; FIG. 3) | 3.157 | 4.622 | 2.664 | 0.846 | 0.154 | 0.216 |
| Spinel structure (Before substitution; FIG. 2) | 4.234 | 5.810 | 2.363 | 1.288 | 0.205 | 0.061 |
| Spinel structure (After 50% substitution; FIG. 4) | 4.379 | 6.083 | 2.366 | 1.337 | 0.220 | 0.329 |
| Spinel structure (After 100% substitution; FIG. 5) | 4.516 | 6.207 | 2.510 | 1.377 | 0.235 | 0.466 |

TABLE 3

| | Property 1 Rates of change | Property 2 Rates of change | Property 3 Rates of change | Property 4 Rates of change | Property 5 Rates of change | Property 6 Rates of change |
|---|---|---|---|---|---|---|
| Rock salt structure (Before substitution → 50% substitution) | +3.8% | +3.8% | +3.5% | +0.11% | +19% | +45% |
| Spinel structure (Before substitution → 50% substitution) | +3.4% | +4.7% | +0.1% | +6.9% | +7.3% | +438% |
| Spinel structure (50% → 100% substitution) | +3.1% | +2.0% | +6.1% | 0% | +6.8% | +41.6% |

As clear from Properties 1 to 4, the Li-anion bond distances are larger on average in the spinel structures than in the rock salt structures, and the standard deviations of the Li-anion bond distances are also larger in the spinel structures than in the rock salt structures. The substitution of Cl by Br gave rise to a higher rate of change in the value of Property 2 and a lower rate of change in the value of Property 3 in the spinel structure compared to the rock salt structure. Thus, in the spinel structure, marked changes in crystal lattices occurred in regions where the bond distance was extended. As a result, the Li conduction is further facilitated and the ion conductivity may be enhanced. That is, as compared to the rock salt structure, the spinel structure comes to have longer Li-anion bonds after the substitution of Cl by Br and probably attains facilitated ion conduction through such enlarged regions.

Regarding Property 5, the fill factor is desirably low in order to ensure the Li diffusion paths. As clear from Table 3, the fill factor in the rock salt structure is increased by 19% after the 50% substitution of Cl by Br. On the other hand, the spinel structure, which has a higher fill factor than the rock salt structure, shows a 7.3% change in the fill factor by the 50% substitution of Cl by Br. That is, the substitution of Cl by Br increases the fill factor in both structures and thus can be a factor that lowers the ion conductivity, but the spinel structure has a low rate of change and thus will show a limited decrease in ion conductivity.

Regarding Property 6, the diffusion of Li will be less inhibited as the value of $r_{min}$ is larger. In the spinel structure, the value of $r_{min}$ was very small before the substitution and the Li diffusion was inhibited, but the value of $r_{min}$ was significantly increased by the substitution of Cl by Br. The value of $r_{min}$ was increased by the substitution also in the rock salt structure, but the rate of change was about 1/10 compared to the spinel structure. That is, the value of $r_{min}$ in the spinel structure is increased by substituting the anions and the ion conductivity will be significantly increased.

As discussed above, when the solid electrolyte material according to the first embodiment has a spinel structure, higher lithium ion conductivity may be realized by the substitution of Cl by Br.

As compared to the rate of change in Property 6 obtained when 50% Cl in the spinel structure was substituted by Br, the rate of change in Property 6 obtained by substituting all the remaining Cl by Br, namely, by substituting 100% Cl by Br was about 1/10. On the other hand, the rates of change in Property 5 were similar between when 50% Cl was substituted by Br and when all the remaining Cl was substituted by Br, namely, when 100% Cl was substituted by Br. As mentioned earlier, the Li diffusion is more facilitated with decreasing value of Property 5 and increasing value of Property 6. That is, the increase in Property 6 contributes less to conductivity enhancement and the increase in Property 5 comes to exert greater influence to cause a decrease in conductivity when the anion substitution rate is raised from 50% to 100% rather than when the substitution rate is raised from 0% to 50%. This is because as the proportion of anion species having a larger ionic radius approaches 100%, the anions occupy more spaces in the crystal structure and come to inhibit the Li conduction. That is, the anion substitution rate is desirably more than 0% and less than 100%.

Probably for the reasons discussed above, the solid electrolyte material according to the first embodiment that includes two or more kinds of anions (that is, X) attains high lithium ion conductivity.

The shape of the solid electrolyte material according to the first embodiment is not limited. For example, the shape of the solid electrolyte material according to the first embodiment is acicular, spherical or elliptical spherical. The solid electrolyte material according to the first embodiment may be in the form of particles. The solid electrolyte material according to the first embodiment may be formed so as to have a pellet or plate shape.

When the solid electrolyte material according to the first embodiment is particles (for example, spheres), the solid electrolyte material may have a median diameter of greater than or equal to 0.1 µm and less than or equal to 100 µm, desirably greater than or equal to 0.5 µm and less than or equal to 10 µm. With this configuration, the solid electrolyte material according to the first embodiment attains higher ion conductivity. Further, such a solid electrolyte material according to the first embodiment may be well dispersed with other materials. The median diameter means the particle size at 50% cumulative volume in the volume-based particle size distribution. The volume-based particle size distribution may be measured with a laser diffraction measuring device or an image analyzer.

To ensure that the solid electrolyte material according to the first embodiment and an active material will be well dispersed, the solid electrolyte material according to the first embodiment may have a median diameter smaller than that of the active material.

Next, a method for producing the solid electrolyte material according to the first embodiment will be described.

For example, the solid electrolyte material according to the first embodiment is produced by the following method.

Powders of halides as raw materials are mixed together so that the mixture has the desired composition. The raw materials are not limited to powders and may be granules or liquids.

When, for example, the material to be produced is $Li_2MgCl_2Br_2$, a LiBr raw material powder and a $MgCl_2$ raw material powder are mixed in a $LiBr:MgCl_2$ molar ratio of 2.0:1.0. The raw material powders may be mixed in a molar ratio precontrolled so as to offset any compositional changes that may occur during the synthesis process.

The raw material powders are reacted together mechanochemically (that is, using a mechanochemical milling method) in a mixing device such as a planetary ball mill to give a reaction product. The reaction product may be heat-treated in vacuum or in an inert atmosphere. Alternatively, the mixture of the raw material powders may be heat-treated in vacuum or in an inert atmosphere. For example, the heat treatment may be performed at a temperature higher than or equal to 100° C. and lower than or equal to 400° C. for 1 or more hours.

In order to suppress compositional changes that may occur during the heat treatment process, the raw material powders may be sealed in a closed container such as a quartz tube and such raw material powders may be heat-treated.

The solid electrolyte material according to the first embodiment may be obtained by the method described above.

Second Embodiment

A second embodiment will be described below. The features described in the first embodiment will be omitted as appropriate.

A battery according to the second embodiment includes a positive electrode, an electrolyte layer and a negative electrode. The electrolyte layer is disposed between the positive electrode and the negative electrode.

At least one selected from the group consisting of the positive electrode, the electrolyte layer and the negative electrode includes the solid electrolyte material according to the first embodiment.

The battery according to the second embodiment attains high charge/discharge characteristics by virtue of its containing the solid electrolyte material according to the first embodiment.

A specific example of the batteries according to the second embodiment will be described hereinbelow.

Figure 7:
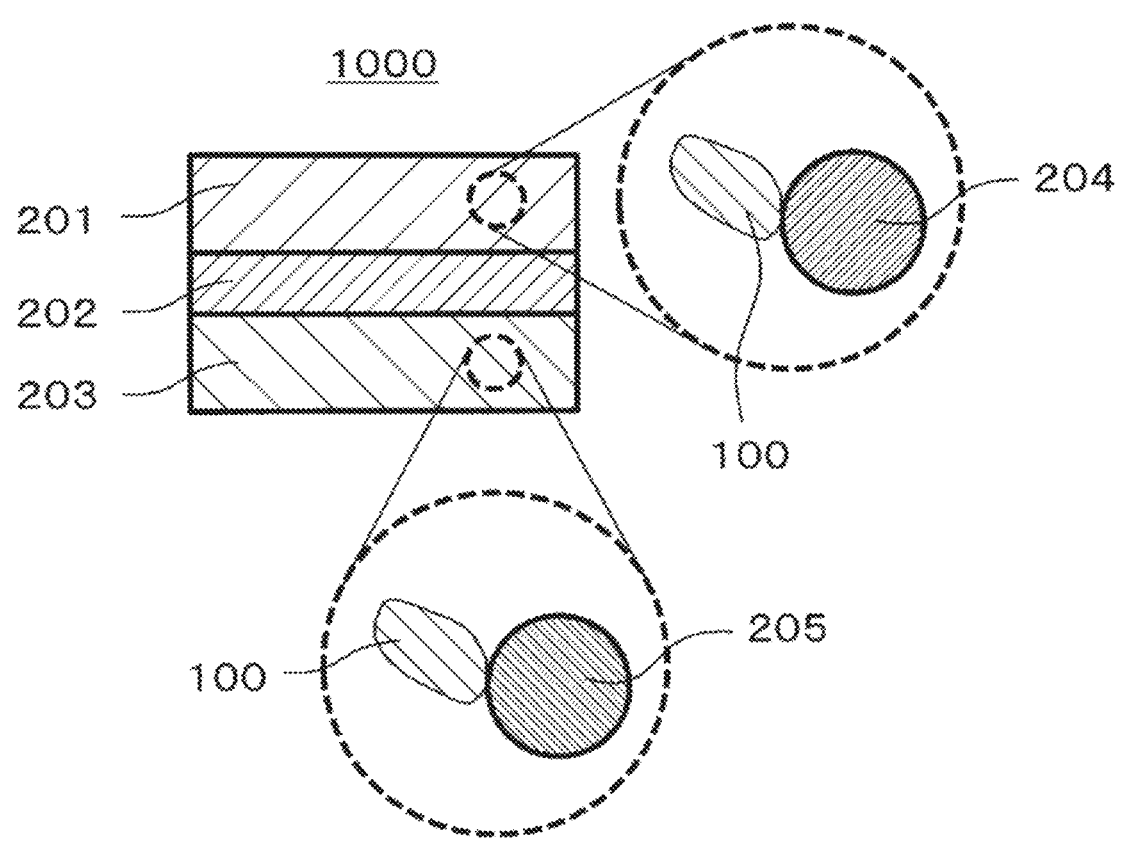
FIG. 7 illustrates a sectional view of a battery 1000 according to a second embodiment.

FIG. 7 illustrates a sectional view of a battery 1000 according to the second embodiment.

The battery 1000 includes a positive electrode 201, an electrolyte layer 202 and a negative electrode 203. The electrolyte layer 202 is disposed between the positive electrode 201 and the negative electrode 203.

The positive electrode 201 includes positive electrode active material particles 204 and solid electrolyte particles 100.

The electrolyte layer 202 includes an electrolyte material (for example, a solid electrolyte material).

The negative electrode 203 includes negative electrode active material particles 205 and solid electrolyte particles 100.

The solid electrolyte particles 100 are particles containing the solid electrolyte material according to the first embodiment as a principal component. The phrase that the particles contain the solid electrolyte material according to the first embodiment as a principal component means that the solid electrolyte material according to the first embodiment represents the largest proportion among the components contained in the particles. The solid electrolyte particles 100 may be particles made of the solid electrolyte material according to the first embodiment.

The positive electrode 201 includes a material capable of storing and releasing metal ions (for example, lithium ions). The material is, for example, a positive electrode active material (for example, the positive electrode active material particles 204).

Examples of the positive electrode active materials include lithium-containing transition metal oxides, transition metal fluorides, polyanionic materials, fluorinated polyanionic materials, transition metal sulfides, transition metal oxyfluorides, transition metal oxysulfides and transition metal oxynitrides. Examples of the lithium-containing transition metal oxides include Li(NiCoAl)O$_2$ and LiCoO$_2$.

The positive electrode active material particles 204 may have a median diameter of greater than or equal to 0.1 μm and less than or equal to 100 μm. When the positive electrode active material particles 204 have a median diameter of greater than or equal to 0.1 μm, the positive electrode active material particles 204 and the solid electrolyte particles 100 may be well dispersed in the positive electrode 201. As a result, the charge/discharge characteristics of the battery are enhanced. When the positive electrode active material particles 204 have a median diameter of less than or equal to 100 μm, the lithium diffusion rate in the positive electrode active material particles 204 is enhanced. Consequently, the battery may be operated at a high output.

The positive electrode active material particles 204 may have a median diameter larger than that of the solid electrolyte particles 100. With this configuration, the positive electrode active material particles 204 and the solid electrolyte particles 100 may be well dispersed.

From the points of view of the energy density and output of the battery, the ratio of the volume of the positive electrode active material particles 204 to the total of the volume of the positive electrode active material particles 204 and the volume of the solid electrolyte particles 100 in the positive electrode 201 may be greater than or equal to 0.30 and less than or equal to 0.95.

From the points of view of the energy density and output of the battery, the positive electrode 201 may have a thickness of greater than or equal to 10 μm and less than or equal to 500 μm.

The electrolyte layer 202 includes an electrolyte material. The electrolyte material is, for example, a solid electrolyte material. The electrolyte layer 202 may include the solid electrolyte material according to the first embodiment.

The electrolyte layer 202 may be composed solely of the solid electrolyte material according to the first embodiment.

The electrolyte layer 202 may be composed solely of a solid electrolyte material distinct from the solid electrolyte material according to the first embodiment. Examples of the solid electrolyte materials distinct from the solid electrolyte materials according to the first embodiment include Li$_2$MgX'$_4$, Li$_2$FeX'$_4$, Li(Al, Ga, In)X'$_4$, Li$_3$(Al, Ga, In)X'$_6$ and LiI. Here, X is at least one element selected from the group consisting of F, Cl, Br and I.

Hereinafter, the solid electrolyte material according to the first embodiment will be written as the first solid electrolyte material. The solid electrolyte material distinct from the solid electrolyte material according to the first embodiment will be written as the second solid electrolyte material.

The electrolyte layer 202 may include not only the first solid electrolyte material but also the second solid electrolyte material that differs. The first solid electrolyte material and the second solid electrolyte material may be uniformly dispersed.

A layer made of the first solid electrolyte material and a layer made of the second solid electrolyte material may be stacked along the stacking direction of the battery 1000.

The electrolyte layer 202 may have a thickness of greater than or equal to 1 μm and less than or equal to 100 μm. When the electrolyte layer 202 has a thickness of greater than or equal to 1 μm, the positive electrode 201 and the negative electrode 203 are unlikely to be short-circuited. When the electrolyte layer 202 has a thickness of less than or equal to 100 μm, the battery may be operated at a high output.

The negative electrode 203 includes a material capable of storing and releasing metal ions (for example, lithium ions). The material is, for example, a negative electrode active material (for example, the negative electrode active material particles 205).

Examples of the negative electrode active materials include metal materials, carbon materials, oxides, nitrides, tin compounds and silicon compounds. The metal materials may be elemental metals or alloys. Examples of the metal materials include lithium metal and lithium alloys. Examples of the carbon materials include natural graphites, cokes, semi-graphitized carbons, carbon fibers, spherical carbons, artificial graphites and amorphous carbons. From the point of view of capacitance density, for example, silicon (that is, Si), tin (that is, Sn), silicon compounds and tin compounds are preferred negative electrode active materials.

The negative electrode active material particles 205 may have a median diameter of greater than or equal to 0.1 μm and less than or equal to 100 μm. When the negative electrode active material particles 205 have a median diameter of greater than or equal to 0.1 μm, the negative electrode active material particles 205 and the solid electrolyte particles 100 may be well dispersed in the negative electrode 203. As a result, the charge/discharge characteristics of the battery are enhanced. When the negative electrode active material particles 205 have a median diameter of less than or equal to 100 μm, the lithium diffusion rate in the negative electrode active material particles 205 is enhanced. Consequently, the battery may be operated at a high output.

The negative electrode active material particles 205 may have a median diameter larger than that of the solid electrolyte particles 100. With this configuration, the negative electrode active material particles 205 and the solid electrolyte particles 100 may be well dispersed.

From the points of view of the energy density and output of the battery, the ratio of the volume of the negative electrode active material particles 205 to the total of the volume of the negative electrode active material particles 205 and the volume of the solid electrolyte particles 100 in the negative electrode 203 may be greater than or equal to 0.30 and less than or equal to 0.95.

From the points of view of the energy density and output of the battery, the negative electrode 203 may have a thickness of greater than or equal to 10 μm and less than or equal to 500 μm.

At least one selected from the group consisting of the positive electrode 201, the electrolyte layer 202 and the negative electrode 203 may include a second solid electrolyte material for the purpose of enhancing the ion conductivity, the chemical stability and the electrochemical stability.

The second solid electrolyte material may be a sulfide solid electrolyte.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$ and $Li_{10}GeP_2S_{12}$.

The second solid electrolyte material may be an oxide solid electrolyte.

Examples of the oxide solid electrolytes include:
(i) NASICON-type solid electrolytes such as $LiTi_2(PO_4)_3$ and derivatives thereof obtained by elemental substitution,
(ii) perovskite-type solid electrolytes such as $(LaLi)TiO_3$,
(iii) LISICON-type solid electrolytes such as $Li_{14}ZnGe_4O_{16}$, $Li_4SiO_4$, $LiGeO_4$ and derivatives thereof obtained by elemental substitution,
(iv) garnet-type solid electrolytes such as $Li_7La_3Zr_2O_{12}$ and derivatives thereof obtained by elemental substitution, and
(v) $Li_3PO_4$ and N-substituted derivatives thereof.

As mentioned earlier, the second solid electrolyte material may be a halide solid electrolyte. Examples of the halide solid electrolytes include $Li_2MgX'_4$, $Li_2FeX'_4$, $Li(Al, Ga, In)X'_4$, $Li_3(Al, Ga, In)X'_6$ and LiI.

Examples of the halide solid electrolytes further include compounds represented by $Li_pMe_qY_rZ_6$. Here, p+m'q+3r=6 and r>0. Me is at least one element selected from the group consisting of metal elements other than Li and Y and metalloid elements. Z is at least one element selected from the group consisting of F, Cl, Br and I. m' represents the valence of Me. The "metalloid elements" represent B, Si, Ge, As, Sb and Te. The "metal elements" represent all the elements in Groups 1 to 12 of the periodic table (except hydrogen) and all the elements in Groups 13 to 16 of the periodic table (except B, Si, Ge, As, Sb, Te, C, N, P, O, S and Se).

From the point of view of ion conductivity, Me may be at least one element selected from the group consisting of Mg, Ca, Sr, Ba, Zn, Sc, Al, Ga, Bi, Zr, Hf, Ti, Sn, Ta and Nb.

The second solid electrolyte material may be an organic polymer solid electrolyte.

Examples of the organic polymer solid electrolytes include polymer compounds and compounds of lithium salts. The polymer compounds may have an ethylene oxide structure. The polymer compounds having an ethylene oxide structure can contain a large amount of a lithium salt, and thus the ion conductivity may be further increased. Examples of the lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$ and $LiC(SO_2CF_3)_3$. A single kind of a lithium salt selected from these may be used singly. Alternatively, a mixture of two or more kinds of lithium salts selected from the above may be used.

At least one selected from the group consisting of the positive electrode 201, the electrolyte layer 202 and the negative electrode 203 may include a nonaqueous electrolyte solution, a gel electrolyte or an ionic liquid for the purposes of facilitating the transfer of lithium ions and enhancing the output characteristics of the battery.

The nonaqueous electrolytic solution includes a nonaqueous solvent and a lithium salt dissolved in the nonaqueous solvent. Examples of the nonaqueous solvents include cyclic carbonate ester solvents, chain carbonate ester solvents, cyclic ether solvents, chain ether solvents, cyclic ester solvents, chain ester solvents and fluorine solvents. Examples of the cyclic carbonate ester solvents include ethylene carbonate, propylene carbonate and butylene carbonate. Examples of the chain carbonate ester solvents include dimethyl carbonate, ethyl methyl carbonate and diethyl carbonate. Examples of the cyclic ether solvents include tetrahydrofuran, 1,4-dioxane and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorine solvents include fluoroethylene carbonate, methyl fluoropropionate, fluorobenzene, fluoroethyl methyl carbonate and fluorodimethylene carbonate. A single kind of a nonaqueous solvent selected from these may be used singly. Alternatively, a mixture of two or more kinds of nonaqueous solvents selected from the above may be used.

Examples of the lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$ and $LiC(SO_2CF_3)_3$. A single kind of a lithium salt selected from these may be used singly. Alternatively, a mixture of two or more kinds of lithium salts selected from the above may be used. The concentration of the lithium salt is, for example, greater than or equal to 0.5 mol/L and less than or equal to 2 mol/L.

The gel electrolyte may be a polymer material impregnated with a nonaqueous electrolytic solution. Examples of the polymer materials include polyethylene oxide, polyacrylonitrile, polyvinylidene fluoride, polymethyl methacrylate, and polymers having ethylene oxide bonds.

Examples of the cations contained in the ionic liquids include:
(i) aliphatic chain quaternary salts such as tetraalkyl ammoniums and tetraalkyl phosphoniums,
(ii) aliphatic cyclic ammoniums such as pyrrolidiniums, morpholiniums, imidazoliniums, tetrahydropyrimidiniums, piperaziniums and piperidiniums, and
(iii) nitrogen-containing heterocyclic aromatic cations such as pyridiniums and imidazoliums.

Examples of the anions contained in the ionic liquids include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$ and $C(SO_2CF_3)_3^-$. The ionic liquid may contain a lithium salt.

At least one selected from the group consisting of the positive electrode 201, the electrolyte layer 202 and the negative electrode 203 may include a binder for the purpose of enhancing the adhesion between the particles.

Examples of the binders include polyvinylidene fluoride, polytetrafluoroethylene, polyethylene, polypropylene, aramid resins, polyamide, polyimide, polyamidimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber and carboxymethylcellulose. Copolymers may also be used as the binders. Examples of such binders include copolymers of two or more kinds of materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid and hexadiene. A mixture of two or more kinds of materials selected from the above may be used as the binder.

At least one selected from the positive electrode 201 and the negative electrode 203 may include a conductive auxiliary for the purpose of enhancing the electron conductivity.

Examples of the conductive auxiliaries include:
(i) graphites such as natural graphites and artificial graphites,
(ii) carbon blacks such as acetylene blacks and Ketjen blacks,
(iii) conductive fibers such as carbon fibers and metal fibers,
(iv) carbon fluoride,
(v) metal powders such as aluminum,
(vi) conductive whiskers such as zinc oxide and potassium titanate,
(vii) conductive metal oxides such as titanium oxide, and
(viii) conductive polymer compounds such as polyaniline, polypyrrole and polythiophene. To reduce the cost, a conductive auxiliary belonging to (i) or (ii) may be used.

Examples of the shapes of the batteries according to the second embodiment include coin shapes, cylindrical shapes, prismatic shapes, sheet shapes, button shapes, flat shapes and laminate shapes.

EXAMPLES

The present disclosure will be described in detail with reference to EXAMPLES and COMPARATIVE EXAMPLES below.

Example 1

[Preparation of Solid Electrolyte Material]

In an argon atmosphere having a dew point of less than or equal to −60° C. (hereinafter, simply written as "argon atmosphere"), LiBr and $MgCl_2$ as raw material powders were provided in a LiBr:$MgCl_2$ molar ratio of 2.0:1.0. These materials were ground and mixed together in a mortar. The mixture thus obtained was milled in a planetary ball mill at 500 rpm for 12 hours.

Thus, a solid electrolyte material of EXAMPLE 1 was obtained. The solid electrolyte material of EXAMPLE 1 had a composition represented by $Li_2MgCl_2Br_2$.

[Evaluation of Ion Conductivity]

Figure 8:
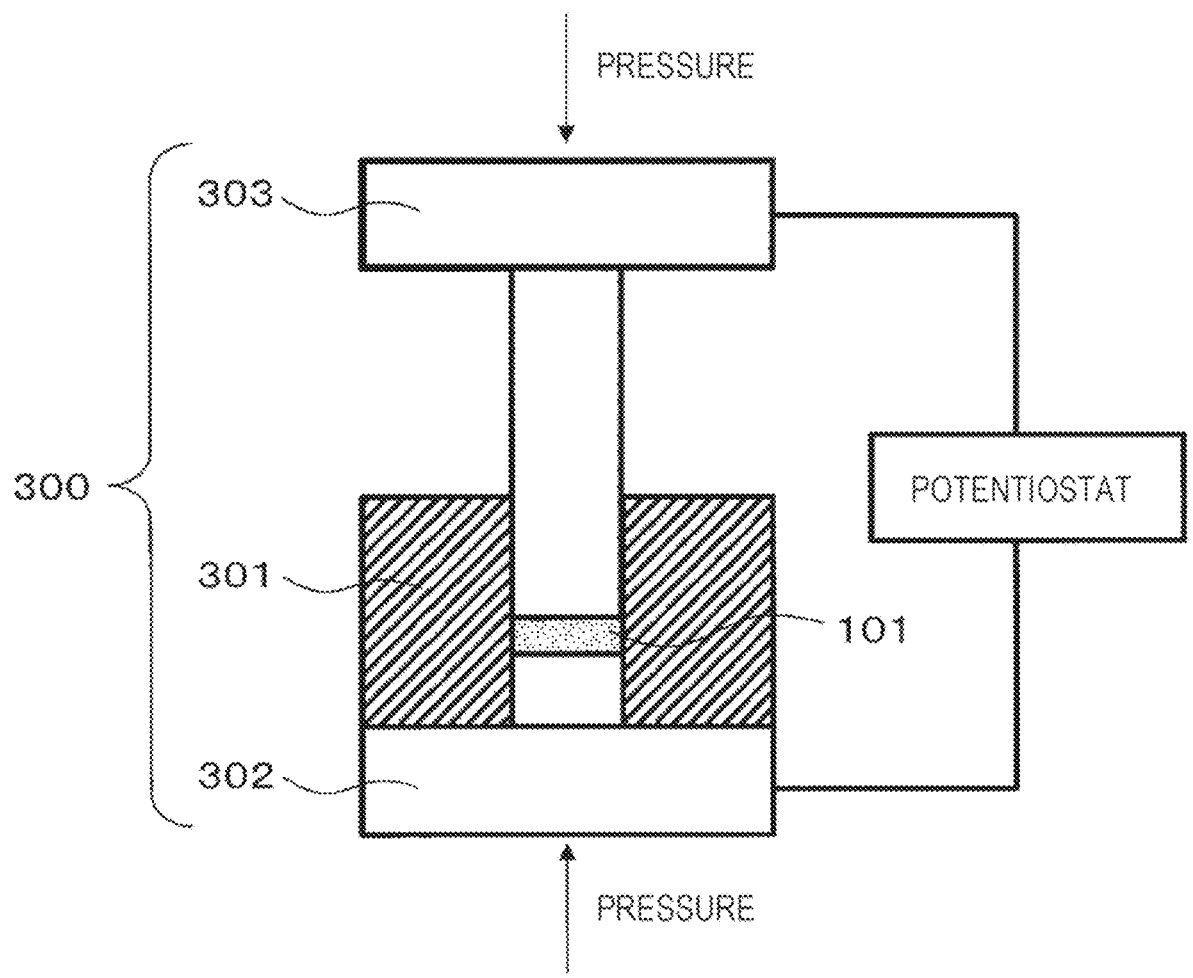
FIG. 8 illustrates a schematic view of a pressure molding die 300 used to evaluate the ion conductivity of a solid electrolyte material.

FIG. 8 illustrates a schematic view of a pressure molding die 300 used to evaluate the ion conductivity of the solid electrolyte material.

The pressure molding die 300 included a die 301, a lower punch 302 and an upper punch 303. The die 301 was formed of an insulating polycarbonate. The lower punch 302 and the upper punch 303 were each formed of electron-conductive stainless steel.

Using the pressure molding die 300 illustrated in FIG. 8, the impedance of the solid electrolyte material of EXAMPLE 1 was measured by the following method.

In an argon atmosphere, the powder of the solid electrolyte material of EXAMPLE 1 (specifically, powder 101 of the solid electrolyte material in FIG. 8) was charged to fill the inside of the pressure molding die 300. Inside the pressure molding die 300, a pressure of 400 MPa was applied to the powder of the solid electrolyte material of EXAMPLE 1 using the lower punch 302 and the upper punch 303.

While maintaining the pressure, the lower punch 302 and the upper punch 303 were connected to a potentiostat (Princeton Applied Research, Versa STAT 4) equipped with a frequency response analyzer. The upper punch 303 was connected to the working electrode and the potential measuring terminal. The lower punch 302 was connected to the counter electrode and the reference electrode. The impedance of the solid electrolyte material was measured at room temperature by an electrochemical impedance measurement method.

Figure 9:
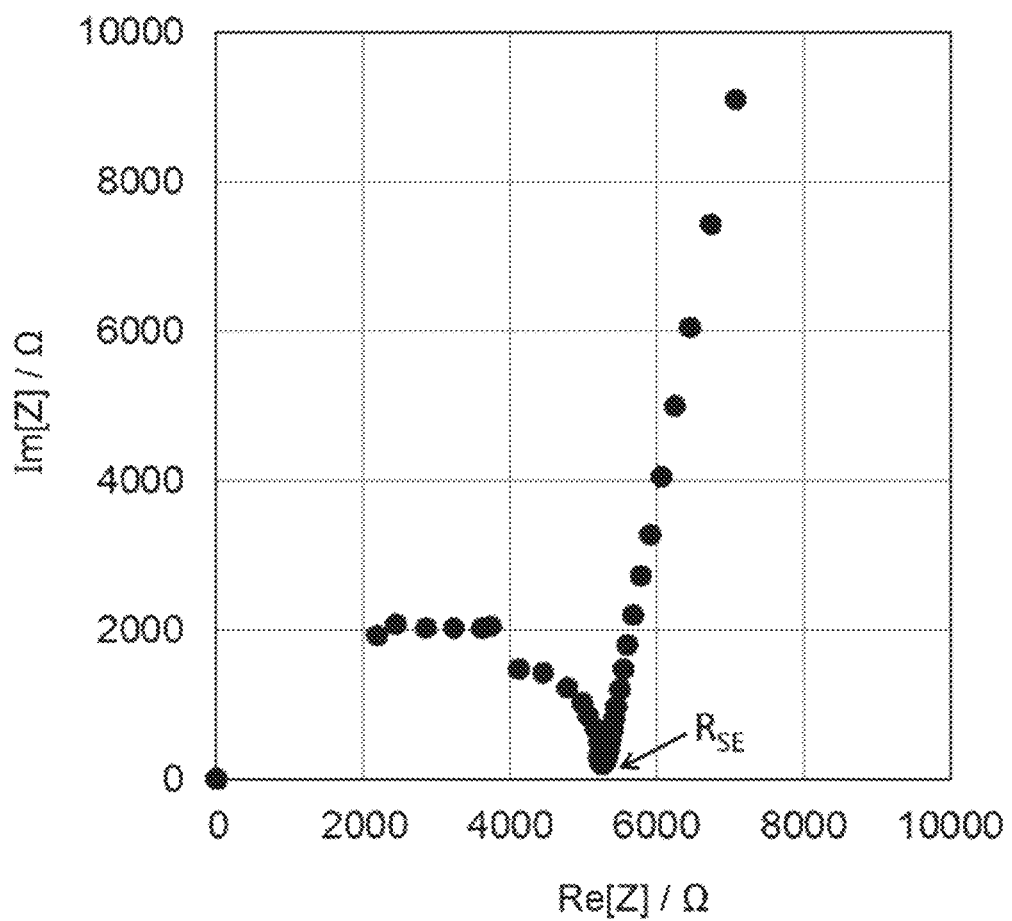
FIG. 9 is a graph illustrating a Cole-Cole diagram of the results of impedance measurement of a solid electrolyte material of EXAMPLE 1.

FIG. 9 is a graph illustrating a Cole-Cole diagram of the results of impedance measurement of the solid electrolyte material of EXAMPLE 1.

In FIG. 9, the real value of impedance at the measurement point where the absolute value of the complex impedance phase was smallest was taken as the value of resistance of the solid electrolyte material to ion conduction. For the real value, refer to the arrow $R_{SE}$ illustrated in FIG. 9.

Using the resistance value, the ion conductivity was calculated based on the following equation (3).

$$\sigma = (R_{SE} \times S/t)^{-1} \qquad (3)$$

Here, σ represents the ion conductivity. S represents the area of contact between the solid electrolyte material and the upper punch 303 (equal to the sectional area of the hollow portion of the die 301 in FIG. 8). $R_{SE}$ indicates the resistance value of the solid electrolyte material in the impedance measurement. The letter t represents the thickness of the solid electrolyte material under pressure (the thickness of the layer formed of the powder 101 of the solid electrolyte material in FIG. 8).

The ion conductivity of the solid electrolyte material of EXAMPLE 1 measured at 25° C. was $1.9 \times 10^{-5}$ S/cm.

[X-Ray Diffraction Pattern]

FIG. 10 is a graph illustrating an X-ray diffraction pattern of the solid electrolyte material of EXAMPLE 1. FIG. 10 also illustrates an X-ray diffraction pattern of $Li_2MgCl_4$ having a spinel structure. The solid electrolyte material of EXAMPLE 1 had a spinel structure. In the solid electrolyte material of EXAMPLE 1, part of Cl constituting $Li_2MgCl_4$ is substituted by Br having a larger ionic radius than Cl. Probably as a result of this, the lattice constants increased and the diffraction peaks in the X-ray diffraction pattern shifted to the lower angle side.

Examples 2 to 5

[Preparation of Solid Electrolyte Materials]

In EXAMPLE 2, LiCl, LiI and $MgCl_2$ as raw material powders were provided in a LiCl:LiI:$MgCl_2$ molar ratio of 1.0:1.0:1.0.

In EXAMPLE 3, LiI and $MgCl_2$ as raw material powders were provided in a LiI:$MgCl_2$ molar ratio of 2.0:1.0.

In EXAMPLE 4, LiI, LiBr and $MgCl_2$ as raw material powders were provided in a LiI:LiBr:$MgCl_2$ molar ratio of 1.0:1.0:1.0.

In EXAMPLE 5, LiBr, $MgCl_2$ and $MgBr_2$ as raw material powders were provided in a LiBr:$MgCl_2$:$MgBr_2$ molar ratio of 1.95:1.0:0.05.

Solid electrolyte materials of EXAMPLES 2 to 5 were obtained in the same manner as in EXAMPLE 1 except for the above changes.

[Evaluation of Ion Conductivity]

The ion conductivity of the solid electrolyte materials of EXAMPLES 2 to 5 was measured in the same manner as in EXAMPLE 1. The measurement results are described in Table 4.

Comparative Examples 1 and 2

[Preparation of Solid Electrolyte Materials]

In COMPARATIVE EXAMPLE 1, LiCl and $MgCl_2$ as raw material powders were provided in a LiCl:$MgCl_2$ molar ratio of 2.0:1.0.

In COMPARATIVE EXAMPLE 2, LiBr and $MgBr_2$ as raw material powders were provided in a LiBr:$MgBr_2$ molar ratio of 2.0:1.0.

Solid electrolyte materials of COMPARATIVE EXAMPLE 1 and COMPARATIVE EXAMPLE 2 were obtained in the same manner as in EXAMPLE 1 except for the above changes.

[Evaluation of Ion Conductivity]

The ion conductivity of the solid electrolyte materials of COMPARATIVE EXAMPLE 1 and COMPARATIVE EXAMPLE 2 was measured in the same manner as in EXAMPLE 1. The measurement results are described in Table 4.

[X-Ray Diffraction Pattern]

An X-ray diffraction pattern of the solid electrolyte material of COMPARATIVE EXAMPLE 1 was measured in the same manner as in EXAMPLE 1. FIG. 10 is a graph illustrating the X-ray diffraction pattern of the solid electrolyte material of COMPARATIVE EXAMPLE 1. The solid electrolyte material of COMPARATIVE EXAMPLE 1 had a spinel structure.

Table 4 describes the compositions and the evaluation results of the solid electrolyte materials of EXAMPLES 1 to 5 and COMPARATIVE EXAMPLES 1 and 2.

TABLE 4

| | Composition | X | Ion conductivity [S/cm] |
|---|---|---|---|
| EX. 1 | $Li_2MgCl_2Br_2$ | Cl, Br | $1.9 \times 10^{-5}$ |
| EX. 2 | $Li_2MgCl_3I$ | Cl, I | $1.1 \times 10^{-5}$ |
| EX. 3 | $Li_2MgCl_2I_2$ | Cl, I | $1.2 \times 10^{-5}$ |
| EX. 4 | $Li_2MgCl_2BrI$ | Cl, Br, I | $1.0 \times 10^{-4}$ |
| EX. 5 | $Li_{1.9}Mg_{1.05}Cl_2Br_2$ | Cl, Br | $2.0 \times 10^{-5}$ |
| COMP. EX. 1 | $Li_2MgCl_4$ | Cl | $1.0 \times 10^{-6}$ |
| COMP. EX. 2 | $Li_2MgBr_4$ | Br | $9.8 \times 10^{-6}$ |

DISCUSSION

The ion conductivity of the solid electrolyte material of EXAMPLE 1 (namely, $Li_2MgCl_2Br_2$) was $1.9 \times 10^{-5}$ S/cm. On the other hand, the ion conductivity of the solid electrolyte material of COMPARATIVE EXAMPLE 1 (namely, $Li_2MgCl_4$) was $1.0 \times 10^{-6}$ S/cm, and the ion conductivity of the solid electrolyte material of COMPARATIVE EXAMPLE 2 (namely, $Li_2MgBr_4$) was $9.8 \times 10^{-6}$ S/cm. These results have confirmed that a solid electrolyte material including Li and M attains higher ion conductivity when the solid electrolyte material contains two or more kinds of anions (namely, X).

The solid electrolyte material of EXAMPLE 4 containing three kinds of anions had an ion conductivity about 100 times higher than that of the solid electrolyte material of COMPARATIVE EXAMPLE 1. The reason for this is probably because Properties 1 to 4 and Property 6 were improved by mixing of the three kinds of anions.

The solid electrolyte materials of EXAMPLES 1 to 5 do not contain sulfur and thus do not generate hydrogen sulfide.

As described above, the solid electrolyte materials according to the present disclosure are suited for providing batteries that do not generate hydrogen sulfide and have high lithium ion conductivity.

The solid electrolyte materials according to the present disclosure are used in, for example, all-solid-state lithium ion secondary batteries.

What is claimed is:

1. A solid electrolyte material represented by the following compositional formula (2):

$$Li_{4-2a}Mg_aCl_pX'_{4-p} \qquad (2)$$

wherein
X' is at least one element selected from the group consisting of Br and I,
0<a<2, and
0<p≤2.

2. The solid electrolyte material according to claim 1, wherein a=1.

3. The solid electrolyte material according to claim 1, which has a spinel structure.

4. A battery comprising:
a positive electrode,
a negative electrode, and
an electrolyte layer disposed between the positive electrode and the negative electrode,
wherein at least one selected from the group consisting of the positive electrode, the negative electrode and the electrolyte layer comprises the solid electrolyte material according to claim 1.

* * * * *